United States Patent [19]

Joba

[11] Patent Number: 4,980,843

[45] Date of Patent: Dec. 25, 1990

[54] INK SAVING METHOD FOR PLOTTERS

[75] Inventor: Lawrence R. Joba, Santa Cruz, Calif.

[73] Assignee: Spectra-Physics, San Jose, Calif.

[21] Appl. No.: 297,483

[22] Filed: Dec. 2, 1988

[51] Int. Cl.$^5$ .............................................. G06F 3/13
[52] U.S. Cl. ................................ 364/520; 346/139 R; 346/140 R
[58] Field of Search .............................. 364/520, 519; 346/140 R, 140 A, 139 R, 29, 1.1; 101/211, DIG. 33; 400/126

[56] References Cited

U.S. PATENT DOCUMENTS

| | | | |
|---|---|---|---|
| 4,208,139 | 6/1980 | Fujimoto et al. | 400/126 |
| 4,533,928 | 8/1985 | Sugiura et al. | 346/146 R |
| 4,543,590 | 12/1985 | Tazaki et al. | 400/126 X |
| 4,698,779 | 10/1987 | Holden et al. | 364/520 |
| 4,716,421 | 12/1987 | Ozawa et al. | 400/126 X |

FOREIGN PATENT DOCUMENTS 2119549  11/1983  United Kingdom ................ 400/126

Primary Examiner—Gary V. Harkcom
Assistant Examiner—Michael A. Jaffe
Attorney, Agent, or Firm—Skjerven, Morrill, MacPherson, Franklin & Friel

[57] ABSTRACT

In a time chart plotter which uses a liquid ink supply (such as an ink jet plotter) the computer program in the plotter microcontroller is modified so that for any one increment of chart movement, each point in the other dimension (i.e., the signal axis) is plotted only once. This conserves ink and also prevents heavy buildup of ink on the chart.

9 Claims, 11 Drawing Sheets

FIGURE 2A
(PRIOR ART)
FIGURE 2B

```
;**************************************************
; INKSGO:
;**************************************************
;
```

The flags PLFLAG and NEXTPEN are first checked for plot mode with the ink on:

```
    JNB     PLFLAG, INKSG6          ;If not Plotting, then Go To INKSG6
    JNB     NEXTPEN, INKSQ6         ;If Pen Off, then Go To INKSQ6
    JNB     PEN, INKSQ5             ;If Pen Was Off, then Go To INKSG6
```

If plotting, then NEXTX is compared with XTARG:

```
    MOV     A, NEXTX
    CJNE    A, XTARG, INKSG6        ;If Next X .ne. X Target
    MOV     A, NEXTX + 1            ;Then, Go To INKSG6
    CJNE    A, XTARG + 1, INKSG6
```

If there is no change in the X Axis, then set SAVEYPOS equal to NEXTX:

```
    MOV     SAVEYPOS, NEXTY         ;Else, Saved Y Position = Next Y
    MOV     SAVEYPOS + 1, NEXTY + 1
```

KEY TO FIG. 4A

| 4A' |
|-----|
| 4A" |
| 4A"'|

FIG. 4A'

And turn on the TWOSTAGE flag:
    SETB    TWOSTAGE                ;Set the TWOSTAGE Flag Check to see if NEXTY is less than YMIN:

MOV     A, NEXTY                ; AB = Next Y
    MOV     B, NEXTY + 1
    CJNE    A, YMMIN, INKSG2        ;If Next Y .ge. Y minimum
    XCH     A, B
    CJNE    A, YMIN + 1, INKSG1
    XCH     A, B
    SJMP    INKSG3

INKSG1:
    XCH     A,B

INKSG2:
    JNC     INKSG3                  ;Then, Go To INKSG3

FIG. 4A"

If is is less, then exchange the YMIN value with NEXTY:

```
        XCH     A, YMIN              ;Else, Exchange Next Y
        MOV     NEXTY, A             ;With Y Minimum
        XCH     A, B
        XCH     A, YMIN + 1
        MOV     NEXTY + 1, A
        SJMP    INKSG7               ;And Go To INKSG7
```

If NEXTY is not less than YMIN,
INKSG3:
Then check to see if NEXTY is greater than YMAX

```
        CJNE    A, YMAX, INKSG5      ;If Next Y .le. Y Maximum
        XCH     A, B
        CJNE    A, YMAX + 1, INKSG4
        XCH     A, B
        SJMP    INKSG11

INKSG4:
        XCH     A, B
```

FIG. 4A'''

KEY TO
FIG. 4B

| 4B' |
|-----|
| 4B" |

INKSG5:
If within YMIN and YMAX limits, then exit without moving or inking:

```
        JC      INKSG11             ;Then Go To INKSG11 to Exit
```

If it is greater, then exchange NEXTY with YMAX

```
        XCH     A, YMAX             ;Else, Exchange Next Y
        MOV     NEXTY, A            ; With Y Maximum
        XCH     A, B
        XCH     A, YMAX + 1
        MOV     NEXTY + 1, A
        SJMP    INKSG7              ;And Go To INKSG7
```

If not plotting a line, or if there is motion in the X axis,
INKSG6:
Then, set YMIN and YMAX equal to NEXTY:

```
        MOV     YMIN, NEXTY             ;Y Minimum = Next Y
        MOV     YMIN + 1, NEXTY + 1
        MOV     YMAX, NEXTY             ;Y Maximum = Next Y
        MOV     YMAX + 1, NEXTY + 1
```

FIG. 4B'

If the TWOSTAGE flag is on,

```
      JNB     TWOSTAGE, INKSG10    ;If Two Stage Flag Off, Go To INKSG10
```

Then exchange NEXTY with SAVEYPOS (the current logical Y position)

```
      MOV     A, NEXTY              ;Exchange Next Y with Saved Y Targ.
      XCH     A, SAVEYPOS
      MOV     NEXTY, A
      MOV     A, NEXTY + 1
      XCH     A, SAVEYPOS + 1
      MOV     NEXTY + 1, A
```

FIG. 4B"

If the TWOSTAGE flag is or was on, then do:
INKSG7:
If there is any motion needed to reach the NEXTY location,

```
        MOV     A, NEXTY
        CJNE    A, YTARG, INKSG8        ;If Next Y .eq. Y Target
        MOV     A, NEXTY + 1
        CJNE    A, YTARG + 1, INKSG8
        SJMP    INKSG9                  ;Then, Go To INKSG9
```

INKSG8:
Then, Save the NEXTPEN flag and the NEXTX location:

```
        MOV     C, NEXTPEN              ;Else, Save Next Pen On Stack
        CLR     NEXTPEN
        PUSH    PSW
        PUSH    NEXTX                   ;Save Next X on Stack
        PUSH    NEXTX + 1
```

Set NEXTX equal to XTARG to inhibit X motion:

```
        MOV     NEXTX, XTARG            ;Next X = X Target
        MOV     NEXTX + 1, XTARG + 1
```

FIG. 4C'

KEY TO FIG. 4C:

| 4C' |
|-----|
| 4C" |
| 4C''' |

Call GONOW to move with no ink to the new line segment:
    CALL    GONOW           ;Go there Now And wait until there:
    CALL    WAIT            ;Wait Until Stopped Retrieve the NEXTX co-ordinate and the NEXTPEN flag:

POP     NEXTX + 1       ;Get Next X from Stack
    POP     NEXTX
    POP     PSW             ;Get Next Pen from Stack
    MOV     NEXTPEN,C If Next X is equal to X Target, Then force Look Ahead Stop MOV     A, NEXTX
    CJNE    A, XTARG, INKSG9    ;If Next X .eq. X Target
    MOV     A, NEXTX + 1
    CJNE    A, XTARG + 1, INKSG9
    SETB    FORCELOOK       ;Then Set Force Look Ahead Flag

FIG. 4C"

INKSG9:
Set NEXTY equal to SAVEYPOS (the Y end point):
    MOV    NEXTY, SAVEYPOS      ;Next Y = Saved Y Position
    MOV    NEXTY + 1, SAVEYPOS + 1

And turn off Two Stage Flag:
    CLR    TWOSTAGE             ;Clear TWOSTAGE Flag INKSG10:
Go to the requested endpoint with the requested pen status:
    CALL   GONOW                ;Go There Now
    RET                         ;And Return INKSG11:
Wait until motion stopped, then exit the routine:
    CALL   WAIT                 ;If not moving, Then Wait
    RET                         ;And Return

FIG. 4C'''

INK SAVING METHOD FOR PLOTTERS

BACKGROUND OF THE INVENTION

1. Field of the Invention

This invention relates to plotters used for scientific and industrial purposes to record data, such as time chart recorders, and specifically to the means used to control such plotters.

2. Description of the Prior Art

Plotters of various kinds are well known in the art. One kind of plotter is used to record data as output from scientific and industrial instrumentation. Typically as shown schematically in FIG. 1, this kind of plotter 2 operates as a strip chart recorder, with a roll of paper 4 (or other media) fed through the plotter 2, and a carriage 6 including a printing device such as a print cartridge moving back and forth on a guide rail along a Y axis as shown relative to the medium 4. Thus the X-axis as shown typically represents the first variable, time, and the second axis is the Y-axis, as defined by the direction of carriage 6 movement, and typically represents a second variable such as a signal.

One version of this type of plotter is ink jet printer-plotters which plot and print by means of ink dots ejected through orifices of a print cartridge which is mounted in the carriage 6. The best known type of print cartridge is the Hewlett Packard thermal ink jet cartridge. Data is output to the printer-plotter 2 on channel 7 from instrumentation 8 or a computer. The printer 2 typically has a built-in microcontroller 10, typically an 8 bit microprocessor. A computer program (not shown) is conventionally installed in ROM 12 in the microcontroller 10 so as to control the printer-plotter 2. The actual plotted line 14 is shown as plotted on medium 4.

The printer-plotter 2, as is typical of this type of device, advances the medium 4 (e.g., paper) in the X direction through the printer-plotter 2 in steps, not continually. The paper is advanced typically by means of a stepper motor. When doing real time data plotting, typically the data points are sent from the system CPU 8 (i.e., the instrumentation or computer) to the plotter every tenth of a second, or 600 times per minute. The chart speeds (i.e., the speed of the medium 4 through the plotter) available range typically from one tenth of a centimeter per minute to 20 centimeters per minute. Thus the medium advances for example at 630 steps to the inch on the time (X direction) axis or 248 steps per centimeter. Since data input points are provided at, for example, 600 times per minute, (600 points/minute)÷(248 steps/cm) is equal to 2.42 centimeters per minute. This means that for this example any time the medium is moving faster than 2.42 centimeters per minute, the medium will take at least one step in the time axis for each data point. When moving slower than that speed there will be two or more data point times for some time steps. If the printer is advancing the medium at its slowest speed, 0.1 centimeter per minute in the example, there will be twenty-four data points plotted for one step in the time axis. Thus one step in the time axis will have twenty-four data points plotted on one time increment. Low level noise motion on the signal axis can cause repeated excursions of the carriage over the same line even if no new data is plotted, providing undesirably twenty-four times as much ink on the medium as needed. This gives a very dark plot line, the ink of which tends to run and so undesirably produces an uneven and smeared plot line as shown in FIG. 2A.

SUMMARY OF THE INVENTION

By turning off the ink supply to the plotter when plotting over previously plotted points, it is possible to save ink and to prevent a heavy ink buildup on the medium. Furthermore, by not moving the plotter carriage (i.e., the print cartridge) when plotting over previously plotted points, the plotting may be speeded up significantly during a replot when the data are recorded and then plotted at a faster than real time rate.

The chief object of the invention is to reduce the overlapping of multiple plot points by plotting a particular point only once. This is accomplished by computer software, preferably resident in the plotter microcontroller, which turns off the ink supply when receiving data to plot a particular point the second (or third or fourth etc.) time, and also does not even move the carriage when receiving data from the instrumentation or computer to plot a particular point the second (or third or fourth etc.) time.

FIG. 2B shows a plot line produced in accordance with the present invention in contrast to the prior art plot line of FIG. 2A.

BRIEF DESCRIPTION OF THE DRAWINGS

FIG. 2A shows a sample plot line produced in accordance with the prior art; FIG. 2B shows a sample plot line produced in accordance with the present invention.

FIGS. 4A, 4B, 4C show an assembly language version of a program of an embodiment of the present invention.

DETAILED DESCRIPTION OF THE INVENTION

In accordance with the present invention, in one embodiment a computer program is installed conventionally in ROM preferably in the Intel 8052 microcontroller (one of 8031 microcontroller family) in an ink jet printer-plotter using the Hewlett Packard thermal ink jet cartridge.

Figure 1:
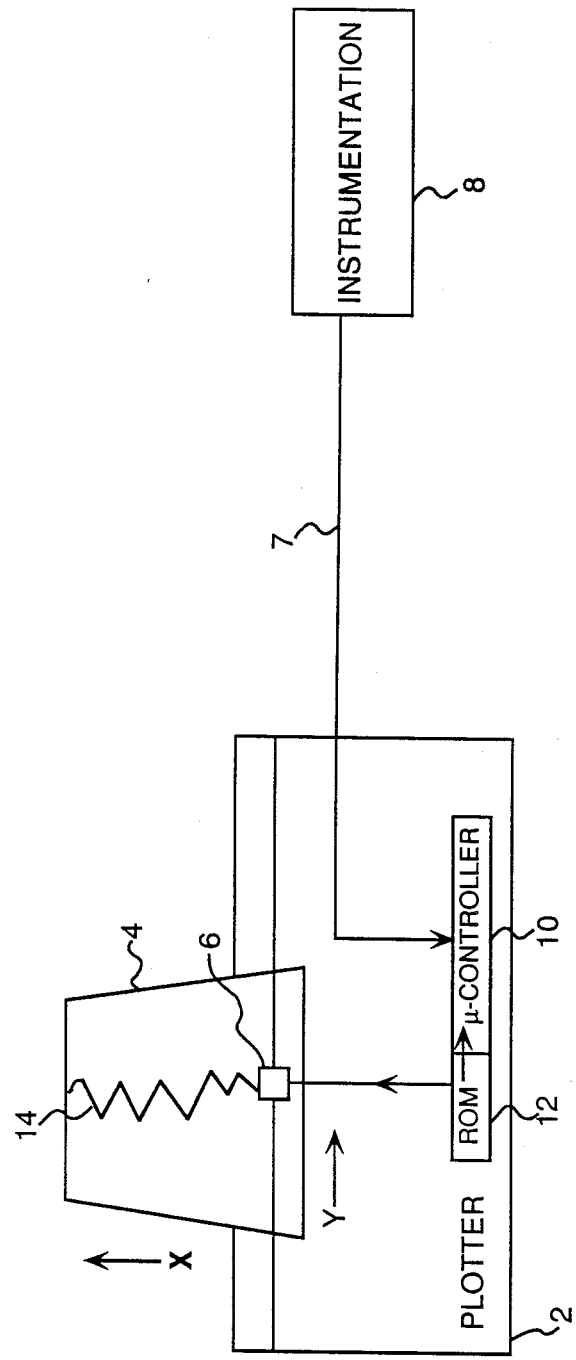
FIG. 1 shows a plotting system consistent with the prior art.
Figure 3:
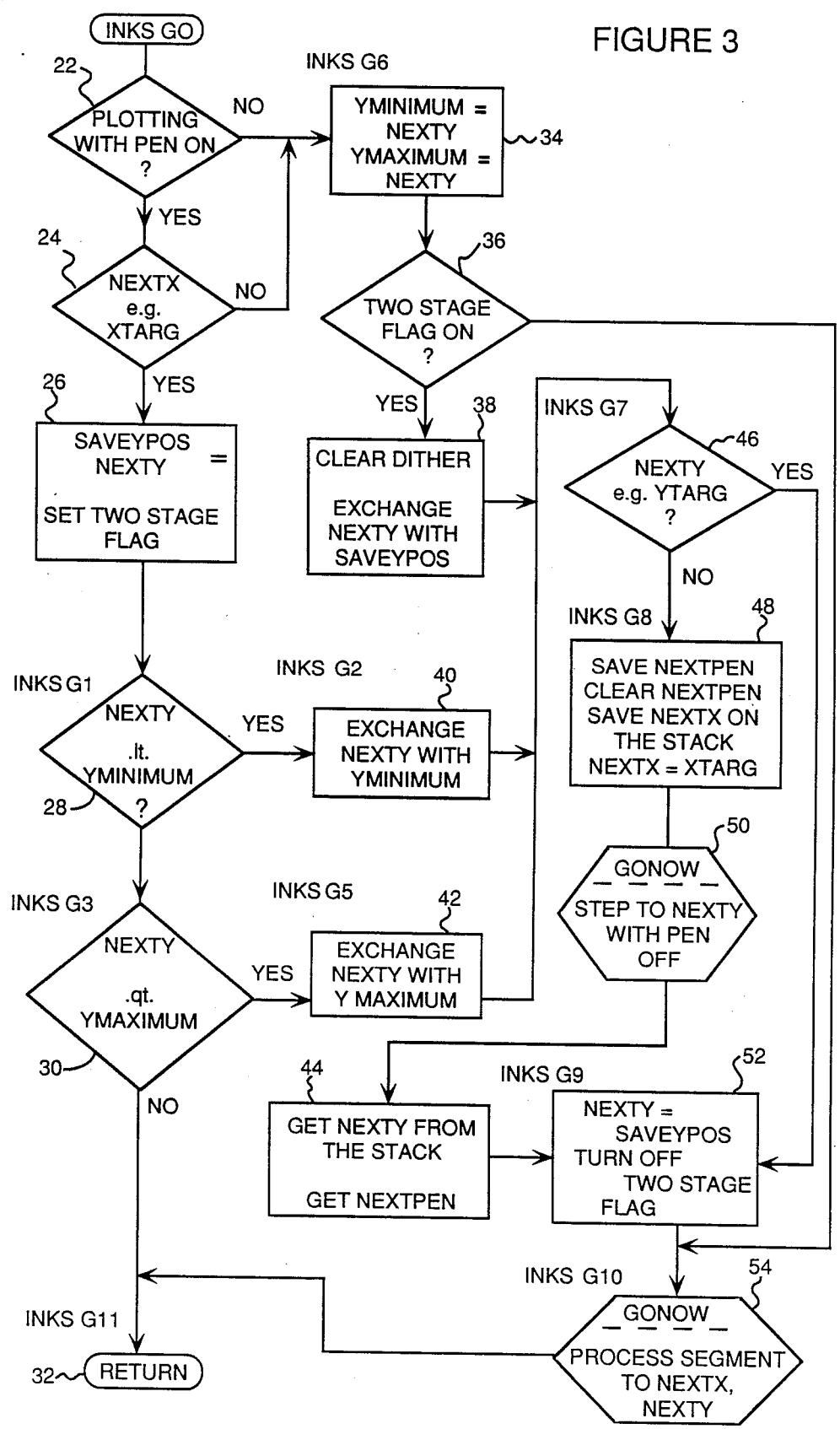
FIG. 3 shows a flowchart depicting an embodiment of the present invention.

The method of the present invention in this embodiment is illustrated in flowchart form in FIG. 3.

The subroutine GONOW is part of the conventional printer control program and is normally called for output of a line segment, output of a printed character, or a non-output motion of the printer carriage. The present invention establishes an exception to that motion and output when the requested motion makes no change in the X-axis (time) and simultaneously the Y-axis (signal) motion overlays an already plotted line segment.

The inputs to GONOW are conventionally (1) the new end point defined by the parameters NEXTX and NEXTY, for the new values on respectively the X and Y axes; (2) a plot mode flag PLFLAG which is off for printing and on for plotting; (3) a pen status flag NEXTPEN which indicates if the pen (i.e., the ink supply for actual plotting) is on or off; (4) XTARG and YTARG which define the end point for previous line segment on respectively the X and Y axes.

Thus the GONOW subroutine is conventionally called by specifying new end point (NEXTX, NEXTY), a plot mode flag PLFLAG and a pen status flag (NEXTPEN). The origin of the line segment is the end point of the previous line segment (XTARG, YTARG).

In order to establish the required exception logic made in accordance with the present invention, four variables are used. These variables are the two end points of the previously inked line, a variable for saving the location where the instrumentation or computer thinks the carriage is, and a flag. Thus the four variables are:

YMIN—The minimum Y excursion of the previously inked line.

YMAX—The maximum Y excursion of the previously inked line.

SAVEYPOS—The current logical Y location of the line.

TWOSTAGE—A flag to indicate activation of the mode of the present invention.

The most direct way through the flowchart of FIG. 3 goes straight from the beginning at INKSGO 20 down to the return 32. On that path there is no new YMIN (i.e., YMINIMUM) at 28 and no new YMAX (i.e., YMAXIMUM) at 30 and no motion in the X-axis direction at 24. If there is a motion in the X direction at 24 or if the pen (i.e, ink supply) is off or the plotter is not plotting at 22, the YMIN and YMAX are reestablished at 34 and are set to be the current value of Y. In other words, the previous bounds on the line segment are removed.

Going to the point where there is a new YMIN at 28, 40 or a new YMAX at 30, 42, the program then checks and if NEXTY (the next value of Y) is equal to the YTARG at 46 (which is the physical carriage location on the Y-axis), that NEXTY value is probably the last end point so the program sets NEXTY equal to SAVEYPOS at 52 which initially was set equal to NEXTY at the beginning 20, so normally SAVEYPOS will be equal to NEXTY on this path. On the escape path SAVEYPOS will have another value.

Then GONOW at 54 is called to draw the line segment. If NEXTY was not equal to YTARG at 46 then NEXTPEN (the pen status) is saved and NEXTX is saved at 48 and GONOW 50 is executed. That will step the print carriage to the point that had been the old Y maximum or minimum, which is the end point of the line segment. That end point is where the pen (i.e., the ink supply) last turned off. Then the program gets NEXTY, and gets NEXTPEN at 44, and sets NEXTY equal to SAVEYPOS at 52 which was saved up at the beginning 20. Now the program goes from what is the end point of the line that was drawn to the new minimum or maximum value to make the line longer. That new end point location is the next YTARG. Thus the carriage is at the end of the new longer line, and the program returns.

The only other possibility is either a user turns the pen off or the plotter stops plotting at 22, or the plotter moves along the X-axis at 24. All three of those cases cause the program to go to INKSG6 where the program will set new minimums and maximums equal to the present location at 34. If the TWOSTAGE flag at 36 is not on, that is the normal path when there is always an X motion for each Y motion, so the program goes to GONOW and draws the line segment at 54.

Thus the program is in the ink saver mode (i.e., TWOSTAGE flag on at 36) only if there is plotting and no X motion. So if there is X motion, or if the pen is turned off, or if there is printing (and not plotting), the program takes the path direct to GONOW at 54. Otherwise if the TWOSTAGE flag is on at 36, the program clears the flag and exchanges the NEXTY with SAVEYPOS at 38 which is the NEXTY from the last motion, or from the last time there was no next motion, which either could be an end point of a plot line established previously or else it is a point skipped over and not plotted because there was no new ink plotted. So the program now begins at the plot point in the middle of that line from which it is desired to draw the new line.

Then the program goes through the path beginning at 46. If NEXTY is not equal to YTARG at 46, the program goes through and will move the carriage to the point in the middle of that line with the pen turned off, and then draw the new line segment from that point in the middle to the location at the new X position and continue on from there.

Thus the program ensures that if the carriage is instructed to move up and down on the Y-axis it will not even move unless the movement will make the inked line longer. Then when the carriage leaves that inked line and goes back to wherever it was logically at the last motion, even if the carriage did not make the last motion, the carriage goes back to that point and draws the line to the new X location.

The relevant portions of the program represented in the flowchart of FIG. 3 are shown in FIGS. 4A, 4B, and 4C in assembly language with comments. The relevant portions of the program consist of the following subroutines:

1. INKSGO at the beginning of the program, to check to see if the pen is on and if the plotter is in plot mode (versus print mode), and to set SAVEYPOS and turn on the TWOSTAGE flag, and to check to see if NEXTY is less than YMIN.

2. INKSG1 checks the value of NEXTY vs. YMIN.

3. INKSG2 exchanges the YMIN value with NEXTY.

4. INKSG3 checks the value of NEXTY vs. YMAX.

5. INKSG4 provides a new value for YMAX.

6. INKSG5 provides an exit without moving the printhead or plotting, or provides a new value of YMAX.

7. INKSG6 sets YMIN and YMAX to equal NEXTY, and exchanges NEXTY with SAVEYPOS, the current logical position of Y.

8. INKSG7 checks to see if NEXTY is equal to YTARG.

9. INKSG8 saves the NEXTPEN flag and the NEXTY location and inhibits X motion and moves the printhead to the new line segment by means of GONOW.

10. INKSG9 sets NEXTY equal to SAVEYPOS.

11. INKSG10 calls GONOW.

12. INKSG11 is the return.

The above description of the invention is illustrative and not limiting. The invention is applicable to any plotter with a moving carriage, even if there is no means to control the ink supply, because it is possible to implement the invention so as to not move the carriage, so as to save time on replots. Similarly, the invention may be implemented so as to not draw lines (that is, turn off the ink supply) even if the carriage is still moved.

An alternative embodiment of the invention would take the form of software resident in the instrumentation or computer to which the printer is connected. The method of the invention is not limited to any particular model of plotters or to inkjet plotters.

I claim:

1. A method of plotting line segments on a medium using a plotter having:
   an ink supply for supplying ink for plotting;
   a carriage movable relative to the medium; and
   control means for controlling movement of the carriage and turning the ink supply on and off;
   the method comprising the steps of:
      plotting a first line segment having two endpoints on the medium;
      storing coordinates of the two endpoints;
      for a second line segment to be plotted, comparing coordinates of two endpoints of the second line segment to the coordinates of the two endpoints of the first line segment; and
      plotting the second line segment while not supplying any ink while plotting any portion of the second line segment that lies between the two endpoints of the first line segment.

2. The method of claim 1, wherein the step of plotting the second line segment includes the step of not moving the carriage over any portion of the second line segment lying between the two endpoints of the first line segment, unless it is necessary to do so to position the carriage so as to plot a portion of the second line segment extending outside the two endpoints of the first line segment.

3. The method of claim 1, wherein the carriage moves relative to the medium in steps along two perpendicular axes.

4. A method of plotting points on a medium for a plotter having:
   an ink supply means for supplying ink for plotting;
   a carriage movable along two perpendicular axes relative to the medium; and
   control means for moving the carriage and turning the ink supply means on and off;
   the method comprising the steps of:
      (a) for a first line segment that has already been plotted, storing coordinates of its two endpoints on the two axes;
      (b) for a second line segment to be plotted, comparing the coordinates of one of its endpoints on a first of the two axes to be stored coordinates of both endpoints of the first line segment on the first axis, and only if there is a coincidence, carrying out the following steps:
      (c) comparing the coordinates of the endpoints of the second line segment on a second of the two axes to the stored endpoint coordinates of the first line segment on the second line;
      (d) positioning the carriage at the first endpoint of the first line segment;
      (e) if both endpoint coordinates of the second line on the second axis lie between the stored endpoint coordinates of the first line segment on the second axis, not moving the carriage and not supplying any ink for plotting the second line segment;
      (f) if a first endpoint of the second line segment on the second axis lies between the two stored endpoint coordinates of the first line segment, and the second endpoint of the second line segment lines closer to the second endpoint of the first line segment then to the first endpoint of the first line segment, then:
      (g) moving the carriage to the second endpoint of the first line segment while not supplying any ink for plotting a first portion of the second line segment;
      (h) then moving the carriage from the second endpoint of the first line segment to the second endpoint of the second line segment while supplying ink for plotting a remaining portion of the second line segment;
      (i) if the first endpoint of the second line segment endpoint lies between the two endpoints of the first line segment, and the second endpoint of the second line segment lies closer to the first endpoint of the first line segment than to the second endpoint of the first line segment, then:
      (j) moving the carriage to the second endpoint of the second line segment while supplying ink for plotting a portion of the second line segment.

5. The method of claim 4, wherein in step (j), the carriage moves directly to the second endpoint of the second line segment from the first endpoint of the first line segment.

6. The method of claim 4, wherein the carriage moves relative to the medium in steps along both axes.

7. A plotter for plotting line segments on a medium comprising:
   an ink supply for supplying ink for plotting;
   a carriage movable relative to the medium; and
   control means for controlling movement of the carriage and turning the ink supply on and off and including:
      means for plotting a first line segment having two endpoints on the medium;
      means for storing coordinates of the two endpoints;
      for a second line segment to be plotted, means for comparing coordinates of its two endpoints to the stored coordinates of the two endpoints of the first line segment; and
      means for plotting the second line segment while not supplying any ink while plotting any portion of the second line segment that lies between the two endpoints of the first line segment.

8. The device of claim 7, wherein the control means further includes means for not moving the carriage over any portion of the second line segment lying between the two endpoints of the first line segment, unless necessary to do so to position the carriage so as to plot a portion of the second line segment extending outside the two endpoints of the first line segment.

9. The device of claim 7, further comprising means for moving a carriage relative to the medium in steps along two perpendicular axes.

* * * * *